(12) United States Patent
Liu et al.

(10) Patent No.: US 12,553,785 B2
(45) Date of Patent: Feb. 17, 2026

(54) HUB DIRECTLY DRIVEN BY MOTOR AND USED FOR HEAVY-DUTY CHASSIS DYNAMOMETER

(71) Applicant: JiangSu XCMG Construction Machinery Research Institute LTD., Jiangsu (CN)

(72) Inventors: Hanguang Liu, Jiangsu (CN); Bin Zhao, Jiangsu (CN); Wei Xu, Jiangsu (CN); Cheng Huang, Jiangsu (CN); Congcong Zhu, Jiangsu (CN)

(73) Assignee: JiangSu XCMG Construction Machinery Research Institute LTD., Jiangsu (CN)

( * ) Notice: Subject to any disclaimer, the term of this patent is extended or adjusted under 35 U.S.C. 154(b) by 359 days.

(21) Appl. No.: 18/276,256

(22) PCT Filed: Mar. 2, 2021

(86) PCT No.: PCT/CN2021/078599
§ 371 (c)(1),
(2) Date: Aug. 8, 2023

(87) PCT Pub. No.: WO2022/174473
PCT Pub. Date: Aug. 25, 2022

(65) Prior Publication Data
US 2024/0125660 A1    Apr. 18, 2024

(30) Foreign Application Priority Data
Feb. 22, 2021   (CN) .......................... 202110196549.2

(51) Int. Cl.
*G01L 3/16*   (2006.01)
*F16D 55/22*  (2006.01)

(52) U.S. Cl.
CPC ................ *G01L 3/16* (2013.01); *F16D 55/22* (2013.01)

(58) Field of Classification Search
CPC ..... G01L 3/16; G01L 5/13; G01L 3/24; G01L 5/0095; F16D 55/22; F16D 2055/0091; F16D 55/225; F16D 65/095
See application file for complete search history.

(56) References Cited

U.S. PATENT DOCUMENTS 5,311,770 A * 5/1994 D'Angelo ............... F16C 19/55
                                                384/126
5,452,605 A * 9/1995 Wilson .............. G01M 17/0072
                                                73/116.06
(Continued)

FOREIGN PATENT DOCUMENTS

CN       101769810       7/2010
CN       108088596       5/2018
(Continued)

OTHER PUBLICATIONS

"International Search Report (Form PCT/ISA/210) of PCT/CN2021/078599," mailed on Nov. 23, 2021, with English translation thereof, pp. 1-6.
(Continued)

*Primary Examiner* — Freddie Kirkland, III
(74) *Attorney, Agent, or Firm* — JCIPRNET (57) ABSTRACT

A hub directly driven by a motor and used for a heavy-duty chassis dynamometer includes a hub body, wherein a mounting surface is arranged on an inner circumference of the hub body and is disposed around a transmission shaft coaxial with the hub body, the transmission shaft is sleeved with a driving assembly, and bearing assemblies are disposed on two sides of the driving assembly in an axial direction respectively; a plurality of axial mounting plates are disposed on an outer circumference of the driving assembly, (Continued)

and tension sensor assemblies are connected to the axial mounting plates located outside the hub body and are mounted on the support frame; and an end, away from the mounting surface, of the transmission shaft, is sleeved with an end flange plate, and a plurality of brake assemblies are disposed on the end flange plate and are mounted on the support frame.

11 Claims, 7 Drawing Sheets

(56) References Cited

U.S. PATENT DOCUMENTS

| | | | | |
|---|---|---|---|---|
| 6,439,037 | B1* | 8/2002 | D'Angelo | G01L 3/16 |
| | | | | 73/116.08 |
| 8,418,541 | B2* | 4/2013 | Kirkpatrick | G01L 3/22 |
| | | | | 73/116.05 |
| 9,404,834 | B2* | 8/2016 | Edelson | G01N 3/00 |
| 9,752,961 | B2* | 9/2017 | Barnes | G01M 17/0072 |
| 9,921,117 | B2* | 3/2018 | Warsaw | G01L 3/20 |
| 2015/0040679 | A1 | 2/2015 | Edelson et al. | |
| 2017/0108388 | A1* | 4/2017 | Warsaw | G01L 3/20 |
| 2024/0118155 | A1* | 4/2024 | Zhao | G01L 5/13 |

FOREIGN PATENT DOCUMENTS

| | | |
|---|---|---|
| CN | 108760341 | 11/2018 |
| CN | 208399061 | 1/2019 |
| CN | 208568127 | 3/2019 |
| CN | 110501170 | 11/2019 |
| CN | 111238827 | 6/2020 |
| CN | 112377603 | 2/2021 |

OTHER PUBLICATIONS

"Office Action of China Counterpart Application", issued on Dec. 14, 2021, pp. 1-5.

* cited by examiner

HUB DIRECTLY DRIVEN BY MOTOR AND USED FOR HEAVY-DUTY CHASSIS DYNAMOMETER

CROSS-REFERENCE TO RELATED APPLICATION

This application is a 371 of international application of PCT application serial no. PCT/CN2021/078599, filed on Mar. 2, 2021, which claims the priority benefit of China application no. 202110196549.2, filed on Feb. 22, 2021. The entirety of each of the above mentioned patent applications is hereby incorporated by reference herein and made a part of this specification.

TECHNICAL FIELD

The invention relates to the technical field of dynamometers, in particular to a hub directly driven by a motor and used for a heavy-duty chassis dynamometer.

DESCRIPTION OF RELATED ART

The chassis dynamometer is an indoor bench test facility used for testing the dynamic property, multi-condition emission index, fuel index, pure-electric mileage and other properties of automobiles and engineering vehicles. The chassis dynamometer calculates a road simulation equation by simulating a road through rollers and can accurately simulate the working condition of automobiles and engineering vehicles, and it can be used for debugging automobiles and engineering vehicles by loading and diagnosing faults of vehicles under a load condition. The chassis dynamometer is convenient to use and reliable in performance, will not be affected by external conditions, and can accurately and rapidly detect the service performance of systems and components of automobiles without disassembling the automobiles. The chassis dynamometer not only can be used for scientific experiments of automobiles, but also can be used for maintenance and detection.

For example, Chinese Utility Model Patent (Publication No. CN208568127U) disclosed, in 2019, a chassis dynamometer driven by a permanent magnet synchronous motor, which comprises a base, a main shaft, an encoder, a torquemeter and a hub, wherein the main shaft is fixedly mounted on the base through a bearing; the hub is fixed on the main shaft, and resistance of the main shaft is provided by a permanent magnet synchronous motor, which comprises a rotary shaft, a shell, a stator assembly and a rotor assembly; the stator assembly is fixedly mounted on the shell and provides a resistance magnetic field for rotation of the rotor assembly; the rotor assembly with the permanent magnet property is disposed between the main shaft and the rotary shaft and is used for measuring the rotational torque between the main shaft and the rotary shaft; and the encoder is used for measuring the rotational speed and rotation angle of the rotary shaft. The chassis dynamometer can be used for dynamometer tests of vehicles in multiple environments; however, it has a large axial size and occupies too much space in the axial direction.

BRIEF SUMMARY OF THE INVENTION

The objective of the invention is to solve the problems of the prior art by providing a hub directly driven by a motor and used for a heavy-duty chassis dynamometer.

To fulfill the above objective, the technical solution adopted by the invention is as follows:

A hub directly driven by a motor and used for a heavy-duty chassis dynamometer comprises a hub body, wherein a mounting surface is arranged on an inner circumference of the hub body and is disposed around a transmission shaft coaxial with the hub body, the transmission shaft is sleeved with a driving assembly, bearing assemblies are disposed on two sides of the driving assembly in an axial direction respectively, and the pair of bearing assemblies are mounted on a support frame through a motor mounting base; sections, close to the mounting surface, of the driving assembly and the motor mounting base are sleeved with an inner side of the hub body; a plurality of axial mounting plates are disposed on an outer circumference of the driving assembly, and tension sensor assemblies are connected to the axial mounting plates located outside the hub body and are mounted on the support frame; and an end, away from the mounting surface, of the transmission shaft, is sleeved with an end flange plate, and a plurality of brake assemblies are disposed on the end flange plate and are mounted on the support frame.

The hub is compact in structure, all components are arranged reasonably, the internal space of the hub body can be fully used to reduce the axial size, and the driving assembly, the brake assemblies and the tension sensor assemblies are all integrated on the hub, such that the hub can be directly applied to a power testing platform, the number of extra transmission parts, brake parts and driving parts is reduced, and the area and space occupied by the whole power testing platform can be reduced; and when the hub is used, the support frame of the hub is mounted on the power testing platform, and then a dynamometer test can be carried out; through the integrated and reasonable spatial arrangement and structure, the hub can output high power and large torque and can be used for heavy-duty tests, and the hub is provided with the independent driving assembly, brake assemblies and tension sensor assemblies, such that wheels can be tested separately, jointly and differentially to comprehensively obtain the performance and data of the wheels and chassis; and a multi-environmental test chamber is arranged to simulate environmental systems under different temperature, humidity and air pressure conditions, such that the performance of a vehicle to be tested can be reflected more accurately.

Considering that hubs used for testing the chassis of heavy-duty truck have a large size, most part of the driving assembly is disposed in the hub body of this structure, such that the axial size can be greatly reduced, and the length of the transmission shaft is decreased; and the transmission shaft and the hub can be mounted only through the bearing assemblies and the motor mounting base and are supported and fixed by the support frame, so the structure is compact, and the support capacity is guaranteed under the precondition that the axial size is reduced.

The tension sensor assemblies are disposed on an outer side of the driving assembly, so the tension sensor assemblies can support the driving assembly and directly obtain the stress of the hub; and the brake assemblies can fulfill a brake function to control the rotational speed of the transmission shaft or stop the transmission shaft and the hub from rotating.

Further, the mounting surface is disposed in the middle of the hub body, a pair of circumferential reinforcing ribs are disposed on the inner circumference close to one end of the hub body, and the pair of circumferential reinforcing ribs are symmetrical with respect to a center of the mounting surface; or, the mounting surface is disposed on the inner circumference close to one end of the hub body, and the circumferential reinforcing ribs symmetrical with the mounting surface are disposed on the inner circumference close to the other end of the hub body.

By adopting the hub body of this structure, the internal space of the hub body can be reasonably used for mounting other parts under the condition that a large size of the outer circumference is guaranteed; due to the fact that multiple hubs may be used in actual application and the driving assemblies of the hubs may be different in power and size, the positions of the mounting surfaces in the hub bodies may be different to guarantee the wheelbase and the center distance, so as to make the hubs with different power basically identical in external structure; and the circumferential reinforcing ribs can further improve the strength and balance performance of the hub body.

Preferably, the transmission shaft is a hollow connecting shaft, and an encoder is connected to and mounted on the end flange plate to obtain the rotational speed, rotation angle and other information of the transmission shaft.

Further, an inner stepped connecting sleeve is disposed in the middle of the mounting surface, an axial size of the connecting sleeve is greater than that of the mounting surface, the connecting sleeve is disposed around a first expandable sleeve, the first expandable sleeve is disposed around and connected to an end of the first transmission shaft in an expanding manner; and a plurality of through holes are formed in the mounting surface in the axial direction.

Further, a pillar protruding outwards is disposed in the middle of the end flange plate, a stepped through hole penetrating through the end flange plate and the pillar is formed in the middle of the end flange plate, an end of the transmission shaft is disposed in the stepped through hole, and a second expandable sleeve is disposed between the stepped through hole and the transmission shaft.

Further, each bearing assembly comprises main bearings disposed around the transmission shaft and mounted at two ends of the motor mounting base in the axial direction respectively, bearing end caps are disposed on inner and outer sides of each main bearing, the bearing end caps abut against and are bolted to the motor mounting base, and an arc-shaped bearing pressing plate is disposed between the bearing end caps and has two ends bolted to the motor mounting base.

The bearing end caps can be further fixed on the motor mounting base through the bearing pressing plates, such that fluctuations in the axial direction and the circumferential direction are reduced, and assembly and disassembly are facilitated.

Further, the support frame is a plate frame structure and comprises a base plate provided with mounting holes, a pair of parallel side plates are disposed on two sides of the base plate, a plurality of arc-shaped support plates are disposed between the pair of side plates, and the motor mounting base is disposed on the arc-shaped support plates; a first mounting plate is connected to an outer side of an end, close to the end flange plate, of the motor mounting base, and the brake assemblies are mounted on the first mounting plate; and second mounting plates are disposed on outer sides of the side plates, and the tension sensor assemblies are mounted on the second mounting plates.

The support frame is made by welding plates, and the arc-shaped support plates can support and fix the motor mounting base to support the transmission shaft and the hub; and the driving assembly can be further supported by the tension sensor assemblies stably to form a cantilever supporting and connecting structure, which rotationally supports the hub together with the brake assemblies at the ends, and reduces the axial width.

Further, a pair of arc-shaped support plates, which are a first arc-shaped support plate and a second arc-shaped support plate respectively, are arranged in parallel; the first arc-shaped support plate is disposed on and supports an end of the motor mounting base, a plurality of outer support plates are welded between the first arc-shaped support plate and the base plate and extend to an end face of the motor mounting base, and upper ends of the outer support plates are connected to the first mounting plate, and a plurality of outer diagonal plates are disposed on two sides of the outer support plates respectively and are welded to the base plate, the first arc-shaped support plate and the end face of the motor mounting base; the second arc-shaped support plate is disposed on and supports the middle of the motor mounting plate in the axial direction, and a plurality of inner oblique rib plates are disposed between the second arc-shaped support plate and the base plate, as well as between the second arc-shaped support plate and an outer circumference of the motor mounting base; and a plurality of through grooves are formed in the first arc-shaped support plate and are staggered with the outer diagonal plates, and a radial through groove is formed in the outer circumference of the motor mounting base.

The arc-shaped support plate on the outer side is exactly flush with an outer end face of the motor mounting base, and the arc-shaped support plate on the inner side supports the middle of the motor mounting base and is close to the end of the hub, such that the hub is supported and can rotate without being affected; and the oblique rib plates can improve the connecting strength, and the oblique rib plates on inner and outer sides have different installation positions and sizes, thus fulfilling different effects under the condition of improving the connecting capacity.

Further, the side plates are multi-step trapezoidal plates, the size of an upper portion of the side plates is less than that of a lower portion of the side plates, and the side plates in this shape can enlarge the support area and occupy less space, and components above can be connected more compactly; the center of each side plate is located in the plane where the center line of the base plate is located, so the stability is better; and the motor mounting base is a semi-circular groove structure, two sides, close to the side plates, of the outer circumference of the motor mounting base are planar structures and closely abut against inner sides of the side plates, and grooves are formed in the outer circumference of the motor mounting base close to steps of the side plates to be used for connecting and mounting the tension sensor assemblies.

Further, a pair of brake assemblies are arranged symmetrically and each comprise a brake mount, brakes are mounted on the brake mounts respectively, the brakes are clamp brakes, and a pair of clamps of each brake are disposed on inner and outer sides of the end flange plate respectively; and the brake mount comprises a first connecting plate, a pair of second connecting plates and a third connecting plate, the first connecting plate is bolted to the support frame, the pair of second connecting plates are disposed between the first connecting plate and the third connecting plate, an acute angle is formed between the third connecting plate and the first connecting plate, the brake is bolted to the third connecting plate, and receding grooves are formed in ends, close to the clamps, of the third connecting plate without affecting rotational movement of the end flange plate. Braking is performed at two symmetrical angles, such that the braking effect is better; and the space of the outer side is reasonably used, such that less space is occupied.

Each tension sensor assembly comprises a tension base which is bolted and fixed to the corresponding axial mounting plate on the outer circumference of the driving assembly, a tie-rod nut is movably connected to the tension base through a pair of connecting pieces, a screw is connected to an end of the tie-rod nut, and a tension sensor is bolted to an end of the screw and is bolted and fixed to the second mounting plate of the support frame; and a pair of tension sensor assemblies are symmetrically disposed on the outer circumference of the driving assembly. In this way, the stress condition of the hub can be obtained through the tension sensors.

Further, the driving assembly comprises a shell in the circumferential direction and covers at the ends, the covers are bolted to two sides of the shell respectively, the middle of each cover protrudes outwards and is connected to the corresponding bearing assembly, and a plurality of wire holes and air holes are formed in the covers in the axial direction; and a permanent magnet synchronous motor is mounted in the shell and can directly act on and drive the transmission shaft to rotate so as to drive the hub to rotate, and a stator assembly of the motor can be mounted in the shell, and a rotor part of the motor is disposed around and connected to the transmission shaft.

The permanent magnet synchronous motors are used for driving, such that a large-torque output environment can be provided, the response speed is high, the rotational speed can be controlled easily, the structure is compact, and the permanent magnet synchronous motors can be directly mounted on the transmission shaft to drive the transmission shaft to rotate so as to drive the hub to rotate; and the shell and the covers are bolted and fixed, and the covers are connected to the motor mounting base through the bearing assemblies, such that the driving assembly and the transmission shaft can rotate on the motor mounting base, the shell does not contact the motor mounting base directly and is supported by the tension sensor assemblies connected to the outer side of the shell.

Compared with the prior art, the invention has the following beneficial effects: 1, the hub is compact in structure, all components are arranged reasonably, the internal space of the hub body can be fully used to reduce the axial size, and the driving assembly, the brake assemblies and the tension sensor assemblies are all integrated on the hub, such that the hub can be directly applied to a power testing platform, the number of extra transmission parts, brake parts and driving parts is reduced, and the area and space occupied by the whole power testing platform can be reduced; 2, the hub is easy and convenient to assemble and disassemble, and when the hub is used, the support frame of the hub is mounted on the power testing platform, and then a dynamometer test can be carried out; 3, through the integrated and reasonable spatial arrangement and structure, the hub can output high power and large torque and can be used for heavy-duty tests, and the hub is provided with the independent driving assembly, brake assemblies and tension sensor assemblies, such that wheels can be tested separately, jointly and differentially to comprehensively obtain the performance and data of the wheels and chassis; 4, considering that hubs used for testing the chassis of heavy-duty truck have a large size, most part of the driving assembly is disposed in the hub body of this structure, such that the axial size can be greatly reduced, the length of the transmission shaft is decreased, the structure is compact, and the support capacity is guaranteed under the precondition that the axial size is reduced; and 5, the tension sensor assemblies are disposed on an outer side of the driving assembly, so the tension sensor assemblies can support the driving assembly and directly obtain the stress of the hub; the brake assemblies can fulfill a brake function to control the rotational speed of the transmission shaft or stop the transmission shaft and the hub from rotating.

DETAILED DESCRIPTION OF THE INVENTION

The technical solution of the invention will be clearly and completely described below in conjunction with the accompanying drawings of the invention. Obviously, the embodiments in the following description are merely illustrative ones, and are not all possible ones of the invention. All other embodiments obtained by those ordinarily skilled in the art based on the following ones without creative labor should fall within the protection scope of the invention.

It should be pointed out that, in the description of the invention, the terms such as "middle", "upper", "lower", "left", "right", "inner" and "outer" are used to indicate directional or positional relations based on the accompanying drawings merely for the purpose of facilitating and simplifying the description of the invention, and do not indicate or imply that devices or elements referred to must be in specific directions or be configured and operated in specific directions, so they should not be construed as limitations of the invention. In addition, terms such as "first" and "second" are used for a purpose of description, and should not be construed as indicating or implying relative importance.

Embodiment 1

Figure 1:
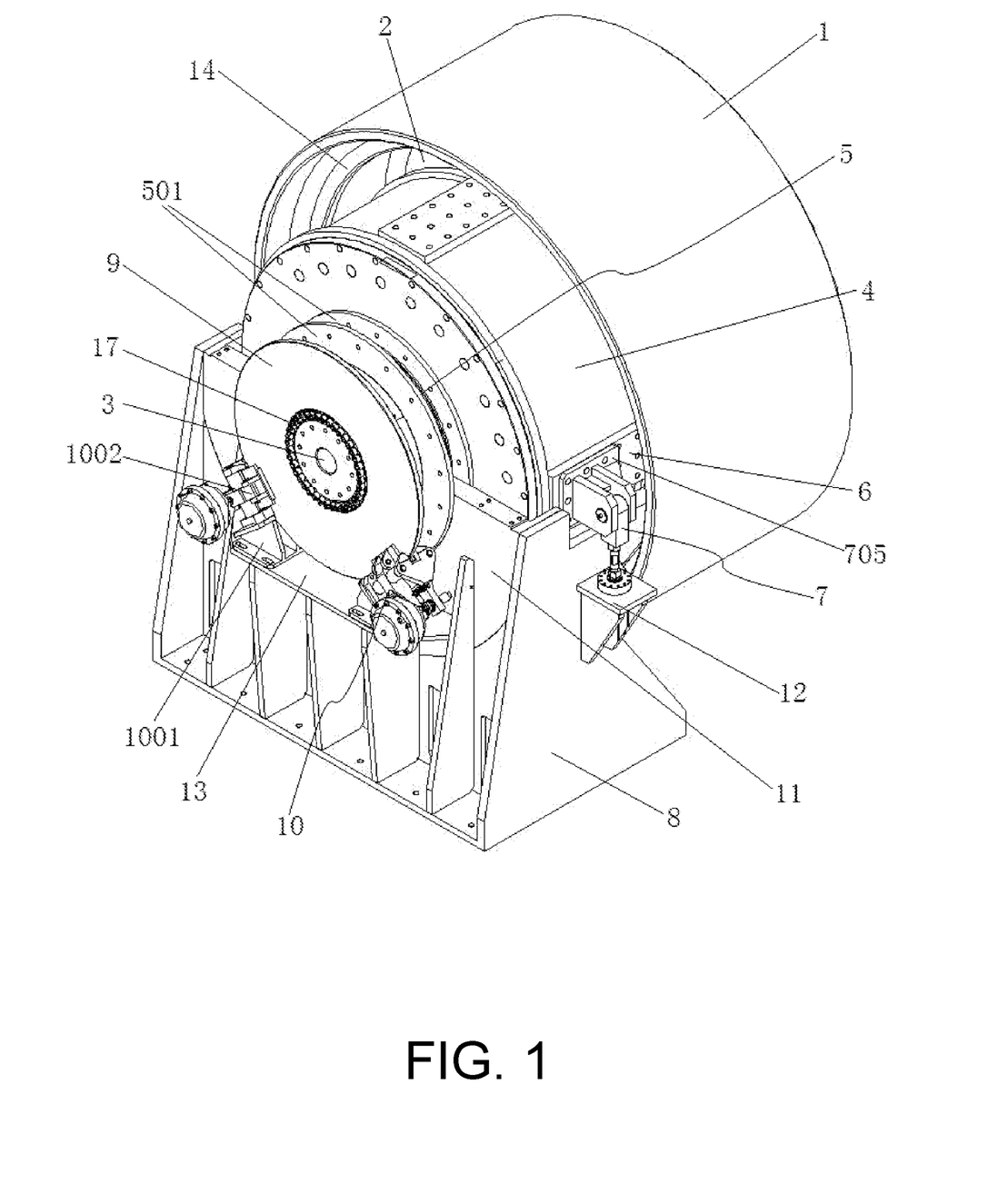
FIG. 1 is a first overall structural view of a hub directly driven by a motor and used for a heavy-duty chassis dynamometer according to the invention.
Figure 2:
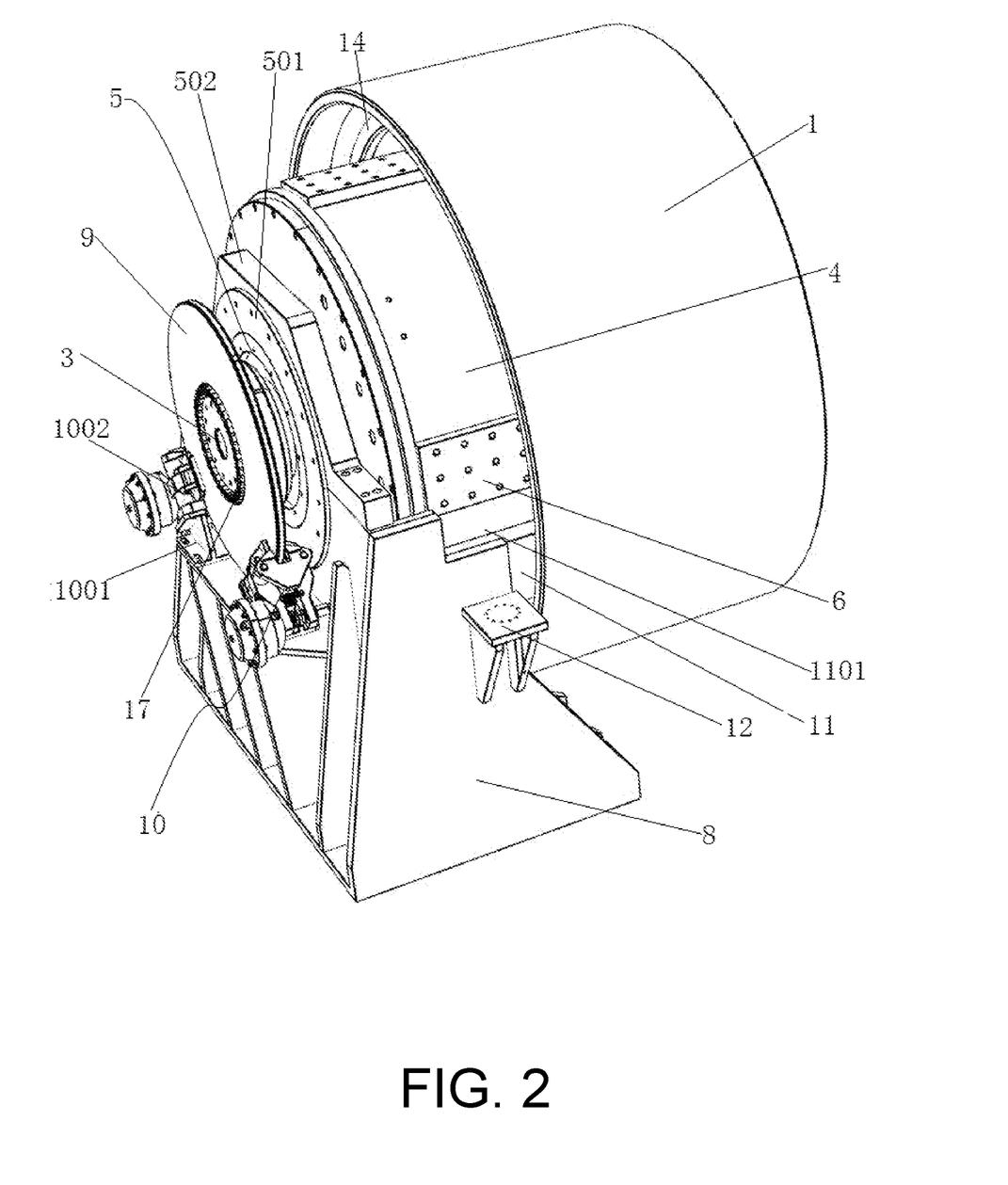
FIG. 2 is a second overall structural view of the hub directly driven by a motor and used for a heavy-duty chassis dynamometer according to the invention.
Figure 3:
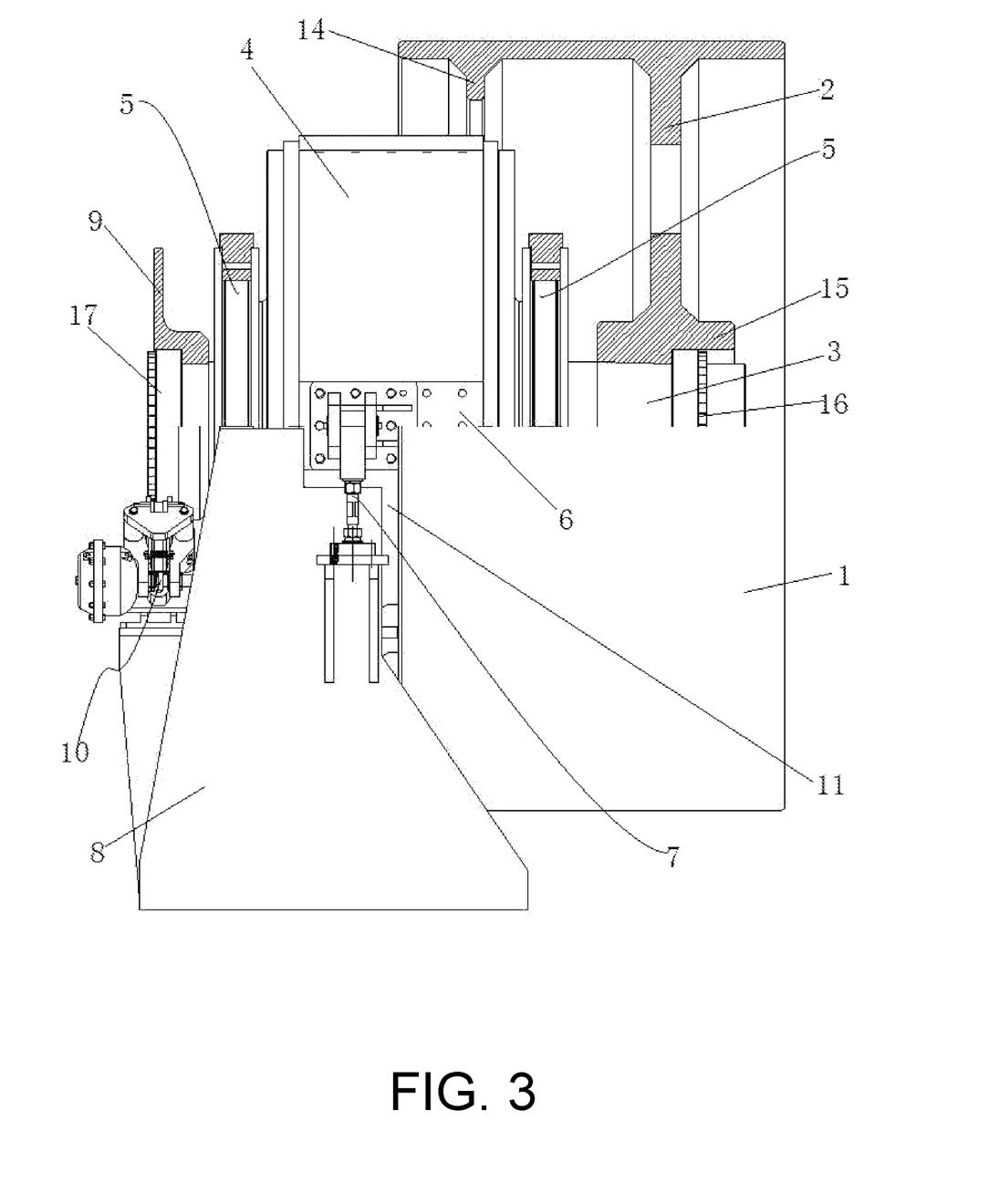
FIG. 3 is a partial sectional structural view of the hub directly driven by a motor and used for a heavy-duty chassis dynamometer according to the invention.

As shown in FIG. 1-FIG. 3, a hub directly driven by a motor and used for a heavy-duty chassis dynamometer comprises a hub body 1, wherein a mounting surface 2 is arranged on an inner circumference of the hub body 1 and is disposed around a transmission shaft 3 coaxial with the hub body 1, the transmission shaft 3 is sleeved with a driving assembly 4, bearing assemblies 5 are disposed on two sides of the driving assembly 4 in an axial direction respectively, and the pair of bearing assemblies 5 are mounted on a support frame 8 through a motor mounting base 11; sections, close to the mounting surface 2, of the driving assembly 4 and the motor mounting base 11 are sleeved with an inner side of the hub body 1; a plurality of axial mounting plates 6 are disposed on an outer circumference of the driving assembly 4, and tension sensor assemblies 7 are connected to the axial mounting plates 6 located outside the hub body 1 and are mounted on the support frame 8; and an end, away from the mounting surface 2, of the transmission shaft 3, is sleeved with an end flange plate 9, and a plurality of brake assemblies 10 are disposed on the end flange plate 9 and are mounted on the support frame 8.

The hub is compact in structure, all components are arranged reasonably, the internal space of the hub body 1 can be fully used to reduce the axial size, and the driving assembly 4, the brake assemblies 10 and the tension sensor assemblies 7 are all integrated on the hub, such that the hub can be directly applied to a power testing platform, the number of extra transmission parts, brake parts and driving parts is reduced, and the area and space occupied by the whole power testing platform can be reduced; and when the hub is used, the support frame 8 of the hub is mounted on the power testing platform, and then a dynamometer test can be carried out; through the integrated and reasonable spatial arrangement and structure, the hub can output high power and large torque and can be used for heavy-duty tests, and the hub is provided with the independent driving assembly, brake assemblies and tension sensor assemblies, such that wheels can be tested separately, jointly and differentially to comprehensively obtain the performance and data of the wheels and chassis; and a multi-environmental test chamber is arranged to simulate environmental systems under different temperature, humidity and air pressure conditions, such that the performance of a vehicle to be tested can be reflected more accurately.

Considering that hubs used for testing the chassis of heavy-duty truck have a large size, most part of the driving assembly 4 is disposed in the hub body 1 of this structure, such that the axial size can be greatly reduced, and the length of the transmission shaft 3 is decreased; and the transmission shaft and the hub can be mounted only through the bearing assemblies 5 and the motor mounting base 11 and are supported and fixed by the support frame 8, so the structure is compact, and the support capacity is guaranteed under the precondition that the axial size is reduced.

The tension sensor assemblies 7 are disposed on an outer side of the driving assembly 4, so the tension sensor assemblies 7 can support the driving assembly 4 and directly obtain the stress of the hub; and the brake assemblies 10 can fulfill a brake function to control the rotational speed of the transmission shaft or stop the transmission shaft and the hub from rotating.

Further, as shown in FIG. 3, the mounting surface 2 is disposed on the inner circumference close to one end of the hub body 1, and circumferential reinforcing ribs 14 symmetrical with the mounting surface 2 are disposed on the inner circumference close to the other end of the hub body 1.

By adopting the hub body 1 of this structure, the internal space of the hub body 1 can be reasonably used for mounting other parts under the condition that a large size of the outer circumference is guaranteed; due to the fact that multiple hubs may be used in actual application and the driving assemblies of the hubs may be different in power and size, the positions of the mounting surfaces in the hub bodies may be different to guarantee the wheelbase and the center distance, so as to make the hubs with different power basically identical in external structure; and the circumferential reinforcing ribs 14 can further improve the strength and balance performance of the hub body 1.

Preferably, the transmission shaft 3 is a hollow connecting shaft, and an encoder is connected to and mounted on the end flange plate 9 to obtain the rotational speed, rotation angle and other information of the transmission shaft.

Further, an inner stepped connecting sleeve 15 is disposed in the middle of the mounting surface 2, the axial size of the connecting sleeve 15 is greater than that of the mounting surface 2, the connecting sleeve 15 is disposed around a first expandable sleeve 16, the first expandable sleeve 16 is disposed around and connected to an end of the first transmission shaft 3 in an expanding manner; and a plurality of through holes are formed in the mounting surface 2 in the axial direction.

Further, a pillar protruding outwards is disposed in the middle of the end flange plate 9, a stepped through hole penetrating through the end flange plate and the pillar is formed in the middle of the end flange plate, an end of the transmission shaft 3 is disposed in the stepped through hole, and a second expandable sleeve 17 is disposed between the stepped through hole and the transmission shaft 3.

Further, each bearing assembly 5 comprises main bearings disposed around the transmission shaft 3 and mounted at two ends of the motor mounting base 11 in the axial direction respectively, bearing end caps 501 are disposed on inner and outer sides of each main bearing, the bearing end caps 501 abut against and are bolted to the motor mounting base 11, and an arc-shaped bearing pressing plate 502 is disposed between the bearing end caps 501 and has two ends bolted to the motor mounting base 11.

The bearing end caps 501 can be further fixed on the motor mounting base 11 through the bearing pressing plates 502, such that fluctuations in the axial direction and the circumferential direction are reduced, and assembly and disassembly are facilitated.

Figure 4:
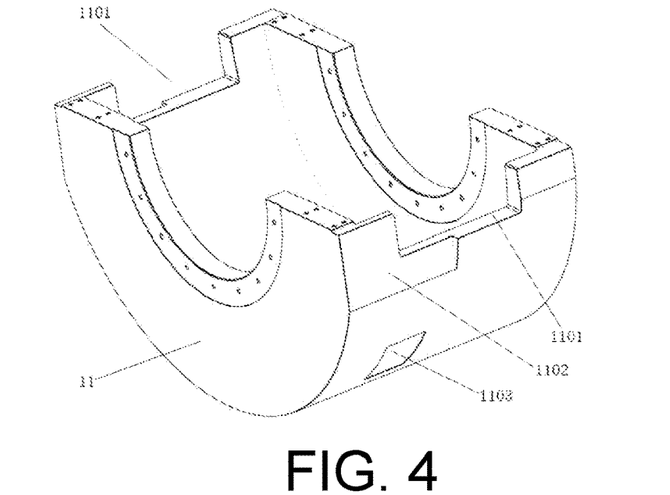
FIG. 4 is a structural view of a motor mounting base of the hub directly driven by a motor and used for a heavy-duty chassis dynamometer according to the invention.
Figure 5:
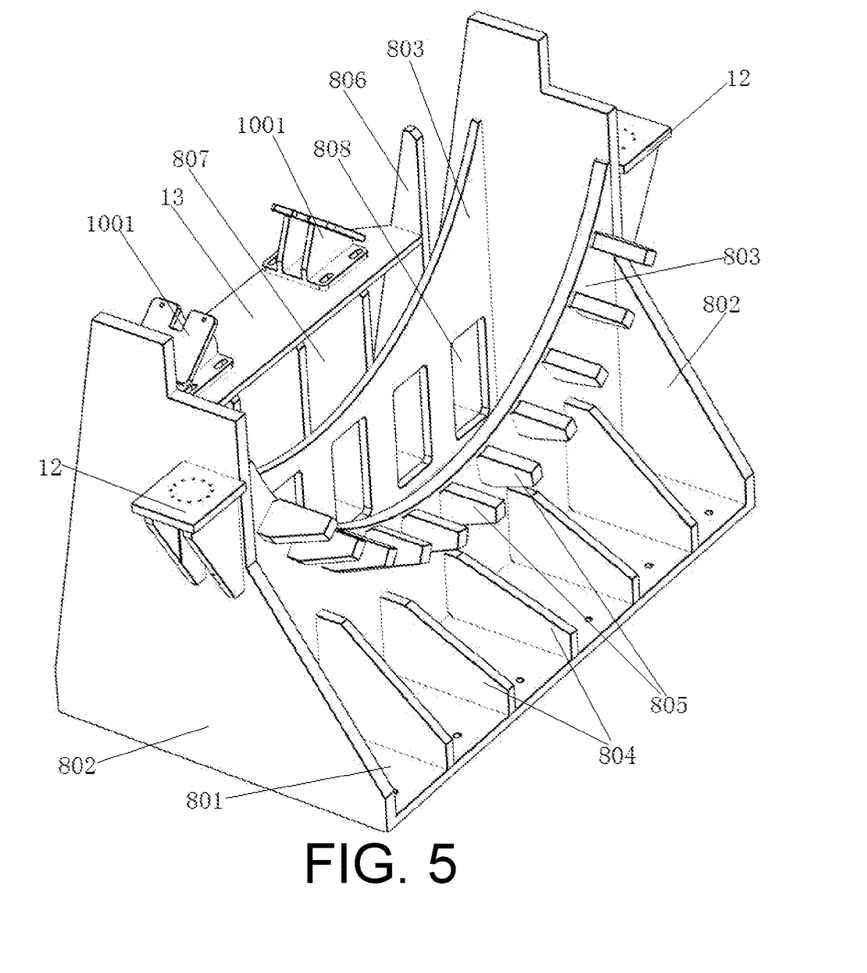
FIG. 5 is a first structural view of a support frame of the hub directly driven by a motor and used for a heavy-duty chassis dynamometer according to the invention.
Figure 6:
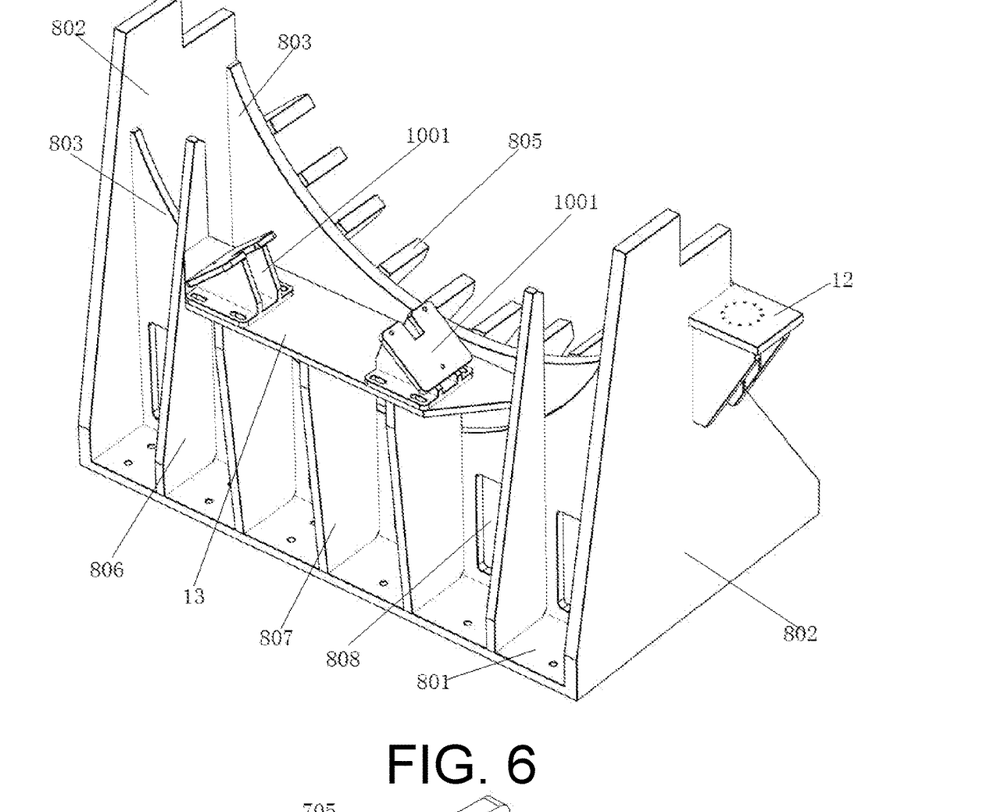
FIG. 6 is a second structural view of the support frame of the hub directly driven by a motor and used for a heavy-duty chassis dynamometer according to the invention.

Further, as shown in FIG. 4-FIG. 6, the support frame 8 is a plate frame structure and comprises a base plate 801 provided with mounting holes, a pair of parallel side plates 802 are disposed on two sides of the base plate 801, a plurality of arc-shaped support plates 803 are disposed between the pair of side plates 802, and the motor mounting base 11 is disposed on the arc-shaped support plates 803; a first mounting plate 13 is connected to an outer side of an end, close to the end flange plate 9, of the motor mounting base 11, and the brake assemblies 10 are mounted on the first mounting plate 13; and second mounting plates 12 are disposed on outer sides of the side plates 802, and the tension sensor assemblies 7 are mounted on the second mounting plates 12.

The support frame 8 is made by welding plates, and the arc-shaped support plates 803 can support and fix the motor mounting base 11 to support the transmission shaft and the hub; and the driving assembly can be further supported by the tension sensor assemblies 7 stably to form a cantilever supporting and connecting structure, which rotationally supports the hub together with the brake assemblies 10 at the ends, and reduces the axial width.

Further, a pair of arc-shaped support plates 803, which are a first arc-shaped support plate (on the outer side) and a second arc-shaped support plate (on the inner side) respectively, are arranged in parallel; the first arc-shaped support plate is disposed on and supports one end of the motor mounting base, a plurality of outer support plates are welded between the first arc-shaped support plate and the base plate and extend to an end face of the motor mounting base, and upper ends of the outer support plates are connected to the first mounting plate, and a plurality of outer diagonal plates are disposed on two sides of the outer support plates respectively and are welded to the base plate, the first arc-shaped support plate and the end face of the motor mounting base; the second arc-shaped support plate is disposed on and supports the middle of the motor mounting plate in the axial direction, and a plurality of inner oblique rib plates are disposed between the second arc-shaped support plate and the base plate, as well as between the second arc-shaped support plate and an outer circumference of the motor mounting base; and a plurality of through grooves 808 are formed in the first arc-shaped support plate and are staggered with the outer diagonal plates, and a radial through groove 1103 is formed in the outer circumference of the motor mounting base.

Oblique rib plates disposed at different positions have different functions and effects; first rib plates 804 are welded between the arc-shaped support plate 803 on the inner side and the base plate 801 at equal intervals to improve the connecting and supporting strength of the arc-shaped support plate 803 on the inner side; first support rib plates 805 are welded between the arc-shaped support plate 803 on the inner side and the motor mounting base 11 at equal intervals and are distributed along the outer circumference of the motor mounting base 11 to increase the support distance and area in the axial direction; second support rib plates 807 are welded between the arc-shaped support plate 803 on the outer side and the base plate 801 and are big-end-up, thus being able to support the first mounting plate 13; and second rib plates 806 are disposed on two sides of the second support rib plate 807, extend upwards and are welded to the end face of the motor mounting base.

Further, the side plates 802 are multi-step trapezoidal plates, the size of an upper portion of the side plates 802 is less than that of a lower portion of the side plates 802, and the side plates 802 in this shape can enlarge the support area and occupy less space, and components above can be connected more compactly; the center of each side plate 802 is located in the plane where the center line of the base plate 801 is located, so the stability is better; and the motor mounting base 11 is a semicircular groove structure, two sides, close to the side plates, of the outer circumference of the motor mounting base 11 are planar structures 1102 and closely abut against inner sides of the side plates 802, and grooves 1101 are formed in the outer circumference of the motor mounting base 11 close to steps of the side plates 802 to be used for connecting and mounting the tension sensor assemblies.

Further, a pair of brake assemblies 10 are arranged symmetrically and each comprise a brake mount 1001, brakes 1002 are mounted on the brake mounts 1001 respectively, the brakes 1002 are clamp brakes, and a pair of clamps of each brake 1002 are disposed on inner and outer sides of the end flange plate 9 respectively; and the brake mount 1001 comprises a first connecting plate, a pair of second connecting plates and a third connecting plate, the first connecting plate is bolted to the support frame, the pair of second connecting plates are disposed between the first connecting plate and the third connecting plate, an acute angle is formed between the third connecting plate and the first connecting plate, the brake 1002 is bolted to the third connecting plate, and receding grooves are formed in ends, close to the clamps, of the third connecting plate without affecting rotational movement of the end flange plate. Braking is performed at two symmetrical angles, such that the braking effect is better; and the space of the outer side is reasonably used, such that less space is occupied.

Figure 7:
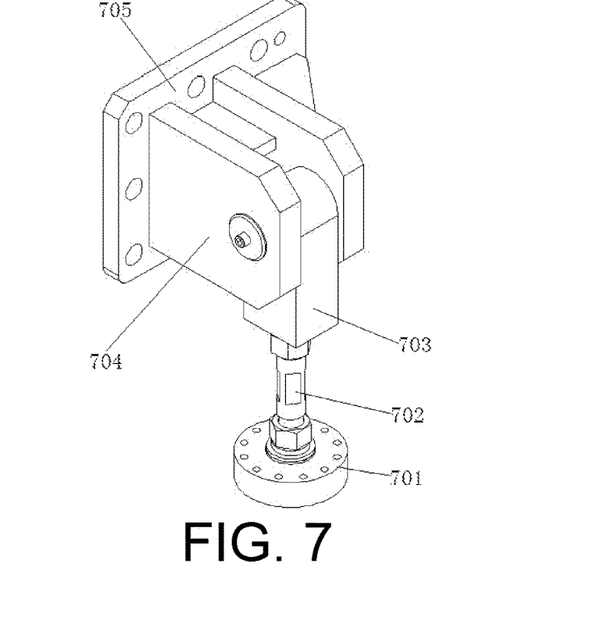
FIG. 7 is a structural view of a tension sensor assembly of the hub directly driven by a motor and used for a heavy-duty chassis dynamometer according to the invention.

As shown in FIG. 7, each tension sensor assembly 7 comprises a tension base 705 which is bolted and fixed to the corresponding axial mounting plate 6 on the outer circumference of the driving assembly 4, a tie-rod nut 703 is movably connected to the tension base 705 through a pair of connecting pieces 704, a screw 702 is connected to an end of the tie-rod nut 703, and a tension sensor 701 is bolted to an end of the screw 702 and is bolted and fixed to the second mounting plate 12 of the support frame 8; and a pair of tension sensor assemblies 7 are symmetrically disposed on the outer circumference of the driving assembly 4. In this way, the stress condition of the hub can be obtained through the tension sensors 701.

Further, the driving assembly 4 comprises a shell in the circumferential direction and covers at the ends, the covers are bolted to two sides of the shell respectively, the middle of each cover protrudes outwards and is connected to the corresponding bearing assembly 5, and a plurality of wire holes and air holes are formed in the covers in the axial direction; and a permanent magnet synchronous motor is mounted in the shell and can directly act on and drive the transmission shaft to rotate so as to drive the hub to rotate, and a stator assembly of the motor can be mounted in the shell, and a rotor part of the motor is disposed around and connected to the transmission shaft.

Embodiment 2

This embodiment differs from Embodiment 1 in that a hub body adopting another connecting structure is provided.

Figure 8:
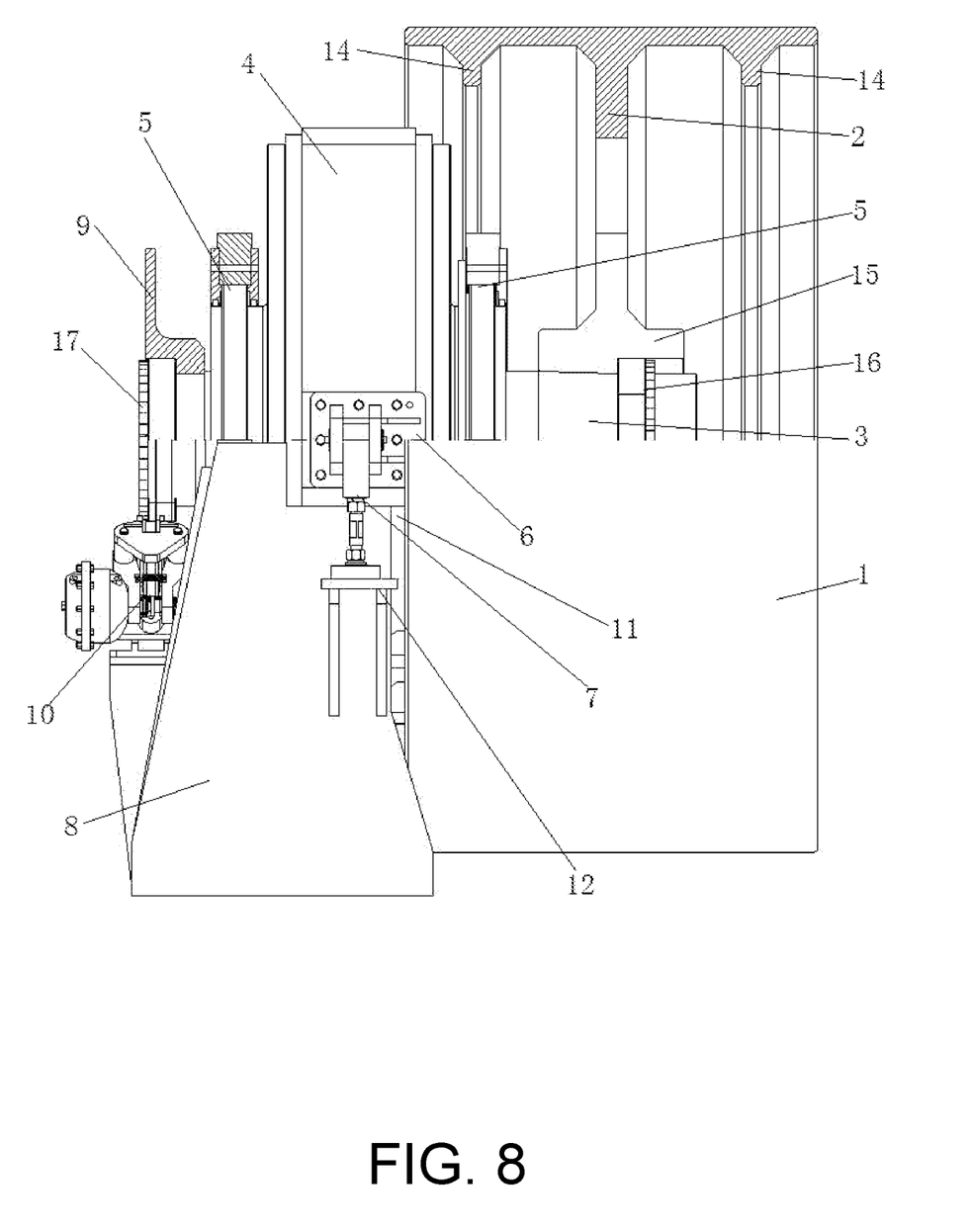
FIG. 8 is another structural view of the hub directly driven by a motor and used for a heavy-duty chassis dynamometer according to the invention.

As shown in FIG. 8, the mounting surface 2 is disposed in the middle of the hub body 1, a pair of circumferential reinforcing ribs 14 are disposed on the inner circumference close to one end of the hub body 1, and the pair of circumferential reinforcing ribs 14 are symmetrical with respect to the center of the mounting surface 2. In this way, the hub body 1 can be stressed more uniformly, and a driving assembly with a smaller size can be disposed on the hub body 1.

Embodiment 3

This embodiment provides a use of the hub in Embodiment 1.

Figure 9:
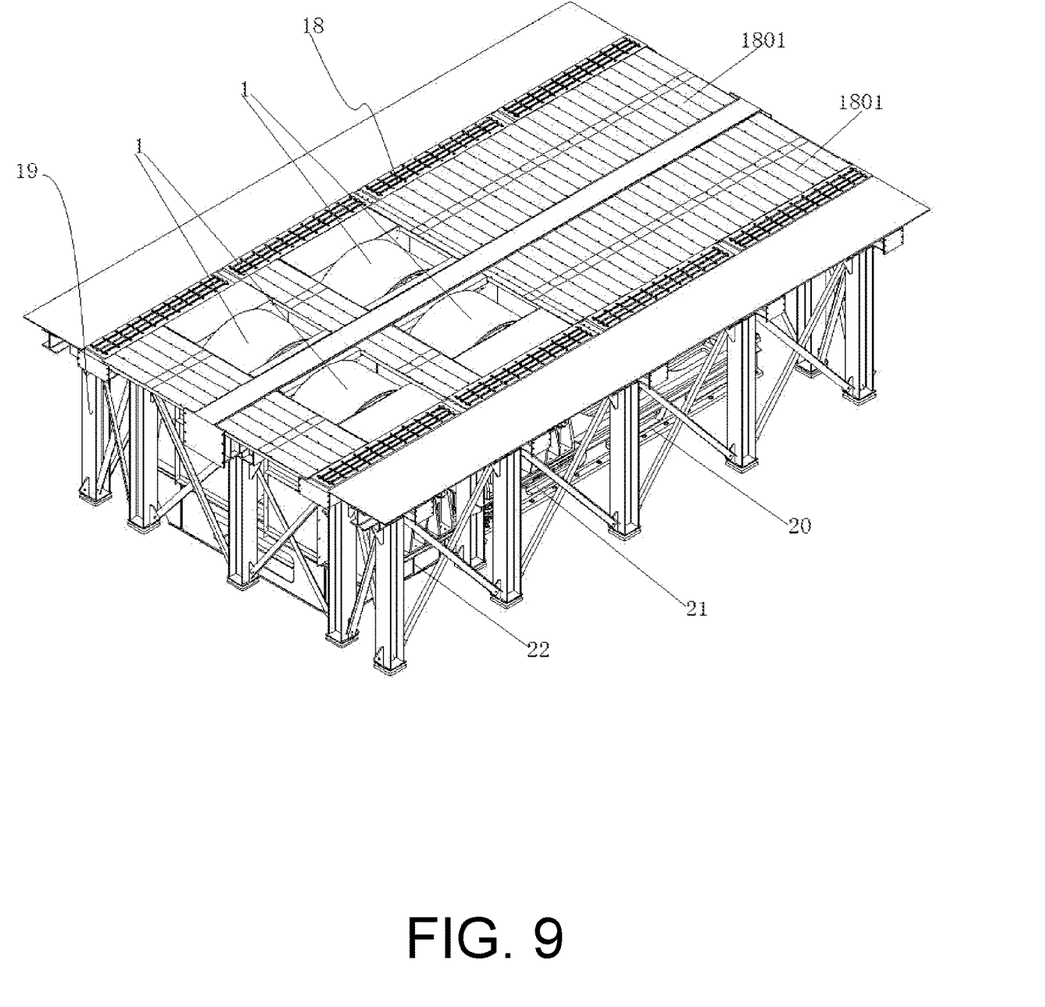
FIG. 9 is a schematic diagram of the hub directly driven by a motor and used for a heavy-duty chassis dynamometer in use according to the invention.

As shown in FIG. 9, a power testing platform 18 located on the ground and a rack 19 located below the power testing platform 18 are disposed in an environment testing chamber, a fixed base 22 and a sliding base 20 which are sequentially arranged in a length direction of the power testing platform 18 are disposed on an inner side of the rack 19, a pair of hubs are mounted on the fixed base 22 through a pair of support frames 8, a sliding platform 21 is disposed on the sliding base 20, and a pair of hubs are mounted on the sliding platform 21 through a pair of support frames 8.

During work, a heavy-duty truck can be directly driven onto the hub bodies 1 and can be tested after centering and debugging, the transmission shafts 3 are driven by the driving assemblies 4 to rotate to drive the hub bodies 1 to rotate so as to drive wheels of the truck to rotate, such that data is acquired.

Through the sliding base 20 and the sliding platform 21, one pair of hubs which are arranged coaxially can be synchronously driven to slide to adjust the distance to the other pair of hubs, so as to test the power of the chassis of different heavy-duty truck, and the application range is wide.

Although the embodiments of the invention have been illustrated and described above, those ordinarily skilled in the art can understand that various transformations, amendments, substitutions and modifications can be made to these embodiments. The scope of the invention is defined by the appended claims and their equivalents.

What is claimed is:

1. A hub directly driven by a motor and used for a heavy-duty chassis dynamometer, comprising a hub body, wherein a mounting surface is arranged on an inner circumference of the hub body and is disposed around a transmission shaft coaxial with the hub body, the transmission shaft is sleeved with a driving assembly, bearing assemblies are disposed on two sides of the driving assembly in an axial direction respectively, and the pair of bearing assemblies are mounted on a support frame through a motor mounting base; sections, close to the mounting surface, of the driving assembly and the motor mounting base are sleeved with an inner side of the hub body; a plurality of axial mounting plates are disposed on an outer circumference of the driving assembly, and tension sensor assemblies are connected to the axial mounting plates located outside the hub body and are mounted on the support frame; and an end, away from the mounting surface, of the transmission shaft, is sleeved with an end flange plate, and a plurality of brake assemblies are disposed on the end flange plate and are mounted on the support frame.

2. The hub directly driven by a motor and used for a heavy-duty chassis dynamometer according to claim 1, wherein the mounting surface is disposed in a middle of the hub body, a pair of circumferential reinforcing ribs are disposed on the inner circumference close to one end of the hub body, and the pair of circumferential reinforcing ribs are symmetrical with respect to a center of the mounting surface; or, the mounting surface is disposed on the inner circumference close to one end of the hub body, and the circumferential reinforcing ribs symmetrical with the mounting surface are disposed on the inner circumference close to the other end of the hub body.

3. The hub directly driven by a motor and used for a heavy-duty chassis dynamometer according to claim 1, wherein an inner stepped connecting sleeve is disposed in a middle of the mounting surface, an axial size of the connecting sleeve is greater than that of the mounting surface, the connecting sleeve is disposed around a first expandable sleeve, the first expandable sleeve is disposed around and connected to an end of the transmission shaft in an expanding manner; and a plurality of through holes are formed in the mounting surface in the axial direction.

4. The hub directly driven by a motor and used for a heavy-duty chassis dynamometer according to claim 1, wherein a pillar protruding outwards is disposed in a middle of the end flange plate, a stepped through hole penetrating through the end flange plate and the pillar is formed in the middle of the end flange plate, an end of the transmission shaft is disposed in the stepped through hole, and a second expandable sleeve is disposed between the stepped through hole and the transmission shaft.

5. The hub directly driven by a motor and used for a heavy-duty chassis dynamometer according to claim 1, wherein each said bearing assembly comprises main bearings disposed around the transmission shaft and mounted at two ends of the motor mounting base in the axial direction respectively, bearing end caps are disposed on inner and outer sides of each said main bearing, the bearing end caps abut against and are bolted to the motor mounting base, and an arc-shaped bearing pressing plate is disposed between the bearing end caps and has two ends bolted to the motor mounting base.

6. The hub directly driven by a motor and used for a heavy-duty chassis dynamometer according to claim 1, wherein the support frame is a plate frame structure and comprises a base plate provided with mounting holes, a pair of parallel side plates are disposed on two sides of the base plate, a plurality of arc-shaped support plates are disposed between the pair of side plates, and the motor mounting base is disposed on the arc-shaped support plates; a first mounting plate is connected to an outer side of an end, close to the end flange plate, of the motor mounting base, and the brake assemblies are mounted on the first mounting plate; and second mounting plates are disposed on outer sides of the side plates, and the tension sensor assemblies are mounted on the second mounting plates.

7. The hub directly driven by a motor and used for a heavy-duty chassis dynamometer according to claim 6, wherein a pair of said arc-shaped support plates, which are a first arc-shaped support plate and a second arc-shaped support plate respectively, are arranged in parallel; the first arc-shaped support plate is disposed on and supports an end of the motor mounting base, a plurality of outer support plates are welded between the first arc-shaped support plate and the base plate and extend to an end face of the motor mounting base, and upper ends of the outer support plates are connected to the first mounting plate, and a plurality of outer diagonal plates are disposed on two sides of the outer support plates respectively and are welded to the base plate, the first arc-shaped support plate and the end face of the motor mounting base; the second arc-shaped support plate is disposed on and supports a middle of the motor mounting base in the axial direction, and a plurality of inner oblique rib plates are disposed between the second arc-shaped support plate and the base plate, as well as between the second arc-shaped support plate and an outer circumference of the motor mounting base; and a plurality of through grooves are formed in the first arc-shaped support plate and are staggered with the outer diagonal plates, and a radial through groove is formed in the outer circumference of the motor mounting base.

8. The hub directly driven by a motor and used for a heavy-duty chassis dynamometer according to claim 6, wherein the side plates are multi-step trapezoidal plates, and a size of an upper portion of the side plates is less than that of a lower portion of the side plates; and the motor mounting base is a semicircular groove structure, and two sides, close to the side plates, of an outer circumference of the motor mounting base are planar structures and closely abut against inner sides of the side plates, and grooves are formed in the outer circumference of the motor mounting base close to steps of the side plates.

9. The hub directly driven by a motor and used for a heavy-duty chassis dynamometer according to claim 6, wherein a pair of said brake assemblies are arranged symmetrically and each comprise a brake mount, brakes are mounted on the brake mounts respectively, the brakes are clamp brakes, and a pair of clamps of each said brake are disposed on inner and outer sides of the end flange plate respectively; and each said tension sensor assembly comprises a tension base which is bolted and fixed to the outer circumference of the driving assembly, a tie-rod nut is movably connected to the tension base through a pair of connecting pieces, a screw is connected to an end of the tie-rod nut, and a tension sensor is bolted to an end of the screw and is bolted and fixed to the support frame; and a pair of said tension sensor assemblies are symmetrically disposed on the outer circumference of the driving assembly.

10. The hub directly driven by a motor and used for a heavy-duty chassis dynamometer according to claim 1, wherein a pair of said brake assemblies are arranged symmetrically and each comprise a brake mount, brakes are mounted on the brake mounts respectively, the brakes are clamp brakes, and a pair of clamps of each said brake are disposed on inner and outer sides of the end flange plate respectively; and each said tension sensor assembly comprises a tension base which is bolted and fixed to the outer circumference of the driving assembly, a tie-rod nut is movably connected to the tension base through a pair of connecting pieces, a screw is connected to an end of the tie-rod nut, and a tension sensor is bolted to an end of the screw and is bolted and fixed to the support frame; and a pair of said tension sensor assemblies are symmetrically disposed on the outer circumference of the driving assembly.

11. The hub directly driven by a motor and used for a heavy-duty chassis dynamometer according to claim 1, wherein the driving assembly comprises a shell in a circumferential direction and covers at ends, the covers are bolted to two sides of the shell respectively, a middle of each said cover protrudes outwards and is connected to the corresponding bearing assembly, and a plurality of wire holes and air holes are formed in the covers in the axial direction; and a direct drive motor or a permanent magnet synchronous motor is disposed in the shell.

* * * * *